United States Patent

Fournier et al.

[11] Patent Number: 5,671,158
[45] Date of Patent: Sep. 23, 1997

[54] APPARATUS AND METHOD FOR EFFECTING WIRELESS DISCOURSE BETWEEN COMPUTER AND TECHNICIAN IN TESTING MOTOR VEHICLE EMISSION CONTROL SYSTEMS

[75] Inventors: Thomas J. Fournier; Bruce R. Kohn; Samuel Chu Lee; Glenn E. Mitchell, all of Tucson, Ariz.

[73] Assignee: Envirotest Systems Corp., Tucson, Ariz.

[21] Appl. No.: 529,843

[22] Filed: Sep. 18, 1995

[51] Int. Cl.$^6$ ............................................. H04H 3/00
[52] U.S. Cl. ................. 364/514 R; 324/409; 348/838
[58] Field of Search ............... 73/23, 2, 36; 324/409, 324/160; 379/21, 420, 430; 345/1, 8; 364/514 R; 455/95, 100; 348/838

[56] References Cited

U.S. PATENT DOCUMENTS

| | | | |
|---|---|---|---|
| 3,998,095 | 12/1976 | Tinkham et al. | 73/117 |
| 4,771,865 | 9/1988 | Hinderling | 187/391 |
| 5,043,659 | 8/1991 | Lowmiller et al. | 324/160 |
| 5,528,660 | 6/1996 | Heins et al. | 379/21 |

*Primary Examiner*—James P. Trammell
*Assistant Examiner*—Thomas Peeso
*Attorney, Agent, or Firm*—Marger, Johnson, McCollom & Stolowitz, P.C.

[57] ABSTRACT

An apparatus and method for use at a motor vehicle emission test station, providing wireless communication between a computer and a technician. The computer includes a sound card and voice recognition software, and is housed in a console, having test equipment, video and audio transmitters, and an audio receiver. The technician wears a portable user interface, including a communications pack with a video receiver, an audio receiver, an audio transmitter, and a battery pack. The interface also includes a special helmet, equipped with a video display, a microphone, and headphones. The wireless communications link established by these transmitters, receivers, and interface components enables the technician to carry out testing and inspection procedures on a motor vehicle in a location remote from the computer. Visually and aurally, the computer provides testing and inspection information and procedures to the technician, and the technician orally enters vehicle identification and license plate information, issues commands, and enters test and inspection results in communication with the computer.

33 Claims, 2 Drawing Sheets

APPARATUS AND METHOD FOR EFFECTING WIRELESS DISCOURSE BETWEEN COMPUTER AND TECHNICIAN IN TESTING MOTOR VEHICLE EMISSION CONTROL SYSTEMS

FIELD OF THE INVENTION

The invention relates broadly to improvements in systems for testing motor vehicle emission control systems. More specifically, the invention pertains to an apparatus and a method, which provide wireless, interactive communication, between computer-driven test equipment and a remotely located vehicle test and inspection technician. The wireless communication system obviates the need for direct physical interaction between the computer and the technician, thereby enhancing the efficiency, accuracy, and safety of the testing process.

BACKGROUND OF THE INVENTION

Motor vehicle emission testing is typically done at centralized stations, employing a plurality of vehicle inspection and testing lanes. Each lane is attended by one or more technicians/inspectors/users, who rely upon specialized testing equipment and computerized data storage and retrieval systems to complete their tasks.

Despite the availability of such sophistocated equipment and systems, actual testing the exhaust emissions and inspecting the Emission Control Systems (hereinafter, "ECS") of motor vehicles still involves numerous complicated procedures. For example, with the testing equipment engaged to the motor vehicle under test, the technician "drives" the vehicle upon test rollers, to simulate a predetermined driving cycle. Wheel speed, roller loading, engine rpm, and exhaust emissions are all monitored and recorded during this cycle. The recorded data is compared to predetermined standards, and a pass/fail determination for exhaust emissions is made.

The technician also makes certain hands-on inspections and manipulations of the ECS components of each vehicle. Thus, in undertaking a vehicle inspection, a technician must identify, locate, and confirm the existence and condition of specific ECS components for the vehicle under test. Examples of such ECS components are the charcoal canister of a fuel vapor recovery system, and the PCV valve on an air/fuel intake system of a motor vehicle.

ECS components are located in different places for each type of vehicle; moreover, they are sometimes hidden, or otherwise difficult and time consuming to locate. The time which a technician spends during the ECS component inspection obviously has a direct bearing on the "through-put" of his lane. Accordingly, the "through-put", or average time required for a technician to complete the necessary testing and inspections of a motor vehicle, is always under review for improvement.

An apparatus and method adapted to assist the technician in this inspection process, are shown in U.S. Pat. No. 5,414,626, the disclosure of which is hereby incorporated by reference. The apparatus and method disclosed in the '626 patent assist the technician in quickly identifying and locating ECS components required for the particular vehicle under test.

In order to utilize the apparatus of the '626 Patent, the technician first examines the vehicle, to determine certain vehicle characteristics, such as the vehicle license plate number, catalytic converter type, and vehicle registration number. Then, the technician walks to the computer, and, using a keyboard, manually enters the vehicle characteristics. The computer quickly retrieves the correct underhood image and ECS component list and component locations for the particular vehicle under test, and displays them on a video monitor. Using the composite image and other information shown on the video monitor as a reference, the technician returns to the vehicle and determines the presence or absence of required ECS components. Lastly, the technician returns to the computer keyboard, and enters data pertaining to the results of his inspection.

While the device of the '626 Patent assists the technician in locating the ECS components, use of the device still requires the technician to walk back-and-forth between the computer console and the vehicle. This travel adds to the "through-put" time, and creates the possibility of errors in data retention and data entry by the technician. In addition, while entering information into the computer, the technician's situational awareness of the work area is impaired, thereby increasing safety risks to others who may be in the area.

Another device technicians may use to decrease "through-put" time is an apparatus for non-intrusively testing motor vehicle evaporative fuel systems. Such a device and a method for using same is shown in U.S. Pat. No. 5,425,266, the disclosure of which is hereby incorporated by reference. The apparatus and method disclosed in the '266 Patent expedite the process of determining if there is a leak in a vehicle's evaporative fuel system. However, the technician still needs to go back and forth from the vehicle to the computer console, either to download the test results manually, or to reconnect the portable test unit to the console for the same purpose.

In order further to improve vehicle "through-put" and reduce technician errors, a number of suggestions have previously been proposed. Among these suggestions were the obvious ones of adding to the number of technicians as well as increasing the number and rearranging the location of the test equipment components at the testing station. The cost effectiveness of such suggestions, however, lacked demonstrability, and in some cases, implementation impaired safety and accuracy. Therefore, the present invention was developed to make better use of recent technological developments in inspection and testing apparatus and to decrease "through-put" times, without having to increase personnel or rearrange existing test equipment.

SUMMARY OF THE INVENTION

The apparatus and method of the present invention provide a wireless, interactive communications link between a computer and the inspector/operator/user conducting the test. This communications link includes user interface apparatus, worn and carried by the technician. The communications link and user interface allow the technician freely to move from place to place during vehicle testing, while at all times remaining both in visual and aural communication with the computer. Use of the invention also allows the technician to remain within the work area during the test, and maintain awareness of any unsafe conditions which may arise.

The user interface apparatus includes miniature communication devices, namely, an audio transmitter, and video and audio receivers. The interface also includes an audio transducer, such as a loudspeaker or headphones, a microphone, and a visor having a small video screen or display.

The computer, typically housed in a console, adjacent a vehicle test lane, has outputs delivering video and audio data to respective radio frequency transmitters. Signals containing the data are thereby sent to the user interface apparatus, worn by the technician. The technician is located adjacent or inside the motor vehicle under test, which may be some distance from the computer console. Computer data are displayed on the video visor screen, located before the inspector's eyes. The visor is designed so the screen does not adversely impair the inspector's field of view. Aural information regarding required testing procedure, status reports, data entry confirmation, and the like, are transmitted from the computer to the user interface apparatus. There, the information is detected, amplified, and directed to the loudspeaker or headphones, adjacent the technician's ear.

Commands and information, voiced by the technician into the microphone, are transmitted by the interface apparatus to a console audio receiver, interconnected to an input of the computer. The computer includes a sound card including voice recognition hardware and software to convert the audio signal into digital form, for use by the computer.

The wireless communications link and user interface apparatus effectively transport data and information prompts to the technician, and transport return data and commands to the computer, with the computer and the technician in locations remote from each other. Testing and inspection procedures are thereby completed by the technician without direct physical interaction with the computer video screen or keyboard.

The present invention also contemplates that plural technicians may be operationally linked to a single computer, for the inspection of a single vehicle; it is also contemplated that a single inspector may be operationally linked to a single, or multiple computers, for the serial inspection of all or portions of a plurality of motor vehicles. In other words, the apparatus and method herein may be used in a variety of situations, so the testing procedures can be performed individually or cooperatively, by technicians whose duties are lane, vehicle, or task dedicated.

DESCRIPTION OF THE PREFERRED EMBODIMENT

Figure 1:
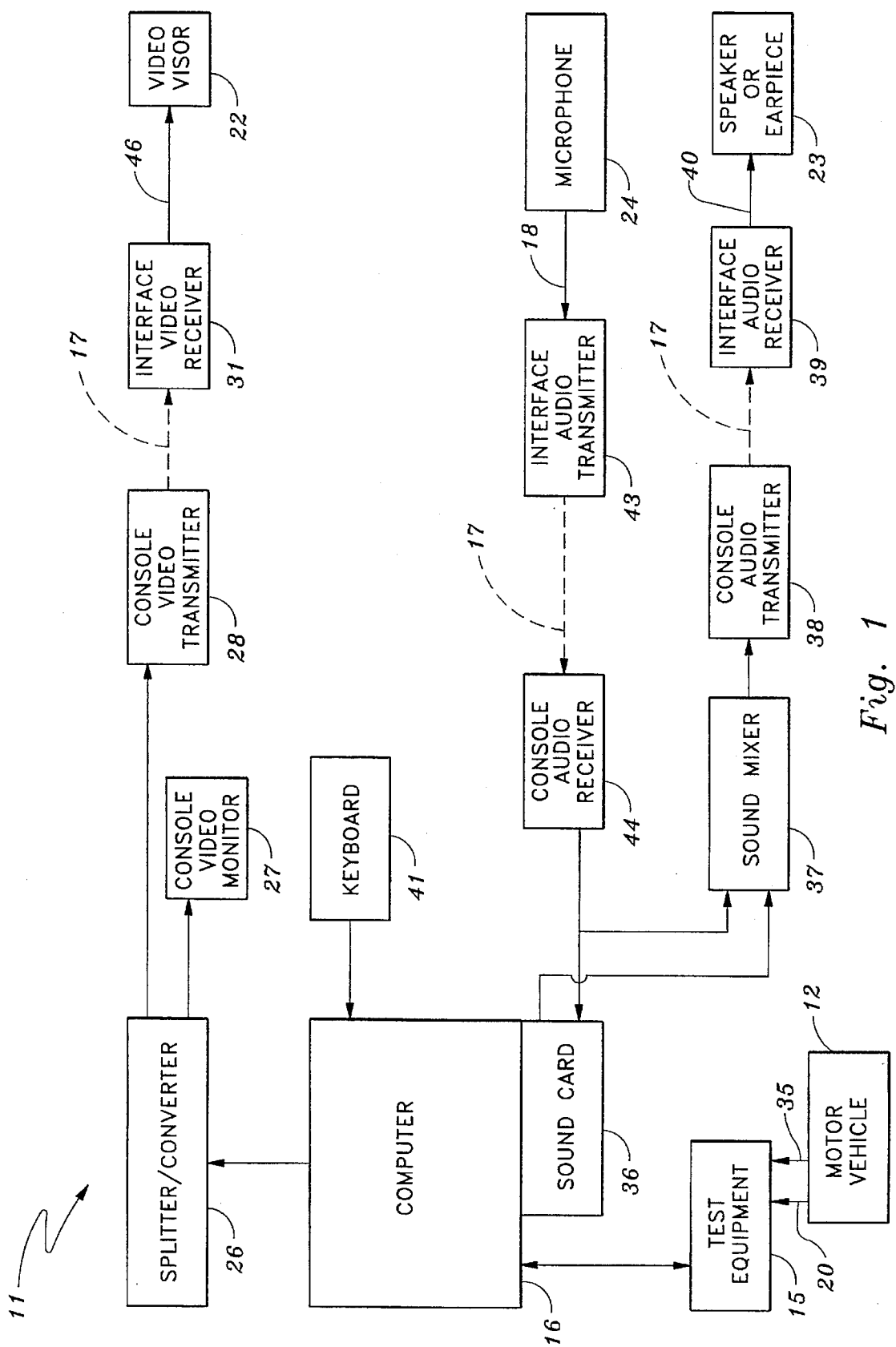
FIG. 1 is a block diagram of the preferred embodiment of the invention, disclosing the major components and their respective, functional relationships.

While the apparatus and method of the invention, generally designated by the reference numeral 11, are susceptible of various modifications obvious to one of ordinary skill in the art, the embodiment shown and the procedures described herein have been tested and have provided very acceptable results.

A motor vehicle 12 under test, is initially positioned in a lane 13 of a motor vehicle testing facility. A pair of ground level rollers (not shown) may be provided within lane 13, under the front or rear drive wheels of the vehicle. These rollers provide support for the vehicle and selective loading on its engine, during a driving test cycle. Vehicle 12 is located adjacent a computer console 14, enabling monitoring components of the console to be connected in convenient fashion to a appropriate parts of the vehicle. The console 14 houses test equipment 15, having, for example, an exhaust pipe sensor probe 20, and a spark plug sensor wire 35.

A computer 16 is also housed in the upper portion of console 14. In accordance with established practice, computer 16 may be linked to telecommunications and satellite systems for communications to and from, remote data bases (not shown). Such data bases may store and retrieve for the computer 16, information such as vehicle ECS characteristics, vehicle license data, and vehicle test results. Whether linked to such outside data bases or existing as a "stand alone" device, computer 16 is used for a variety of functions herein, including retrieval and storage of ECS data and testing procedures, storage and comparison of vehicle test results with predetermined standards, and management/monitoring of the test equipment 15.

Figure 2:
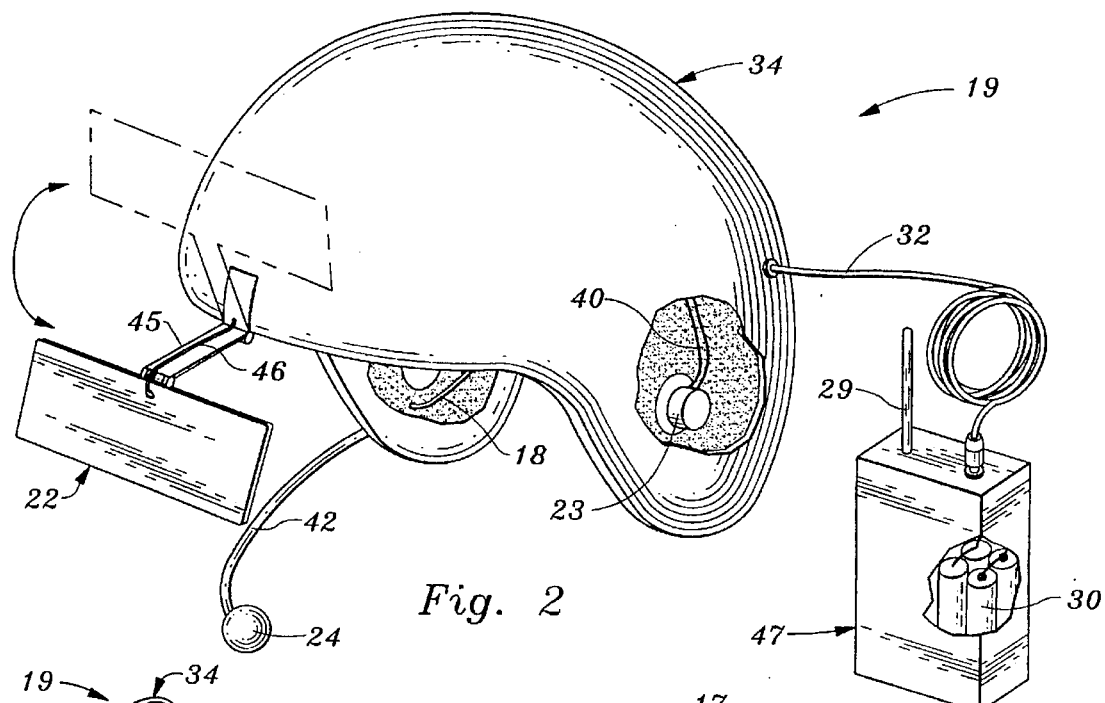
FIG. 2 is a left front perspective view of the user interface apparatus, in the preferred form of a specially equipped helmet and a communications pack, containing a video receiver, an audio receiver, an audio transmitter, and batteries.
Figure 3:
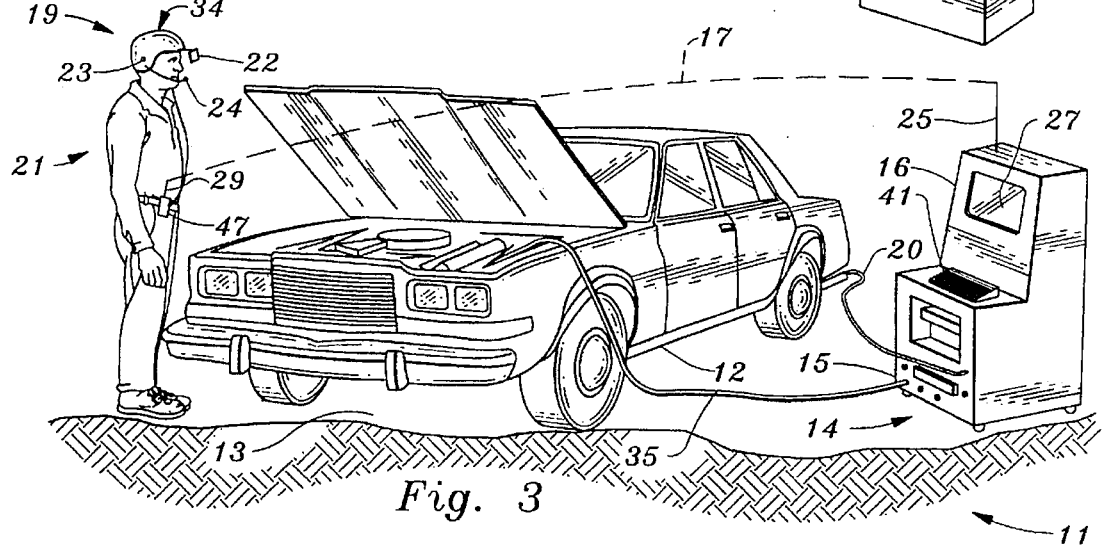
FIG. 3 is a perspective view showing a motor vehicle under test, together with a computer and its console, and a technician wearing the helmet and the self-contained communications pack; and, FIG. 4 is a front elevational view, taken to an enlarged scale, of the video visor display screen, illustrating one screen of vehicle data which may be displayed for the technician during the test procedure.

The device 11 also includes a wireless communications link, represented by a broken line in the drawings which is identified by the numeral 17. Communications link 17, preferably operating at radio frequencies, conveys commands to the computer 16 from a remotely located user interface, generally designated by the numeral 19 (see FIG. 2). User interface 19 is completely portable, and is worn by the technician or user 21, during inspection and testing of vehicle 12. In addition to giving commands over the link 17, the technician 21 may also receive data from, and transmit data to, the computer 16, in a manner to be described more fully below.

The user interface 19 includes a helmet 34 and a communications pack 47. A video visor 22 is affixed to the front, lower edge of the helmet by a swing-away, double-hinged bracket 45. The hinges at both ends of bracket 45 allow convenient adjustment of the vertical location and the vertical inclination of visor 22 (see FIG. 2). The size, configuration, and location of the video visor 22 are such, that the technician's forward visibility, or field of view, is not unduly obstructed. This allows presentation of video data on a screen or display 33, while the technician is simultaneously inspecting ECS components and conducting vehicle driving tests. Preferably, screen 33 uses liquid crystal technology for direct presentation of the data before the eyes of the technician. Alternatively, a pellicle mirror before one eye of the technician, may be used to project data from an off-axis display of selected design.

Helmet 34 also includes an internal audio transducer 23, such as a loudspeaker or one or more earpieces, mounted in adjacent relation to an ear of the technician. An adjustable boom 42 maintains a microphone 24 in proper relation to the technician's mouth. Boom 42 also passes a microphone cord 18, into the interior of helmet 34. From there, cord 18 joins a visor drive cable 46 and earphone wires 40, to exit helmet 34 within a cable harness 32. The harness 32 extends approximately three or four feet, where it is plug-inserted into communications pack 47.

Communications pack 47 includes a power supply, preferably in the form of rechargeable batteries 30. Also housed within pack 47 are an interface video receiver 31, an interface audio transmitter 43, and an interface audio receiver 39 (see FIG. 1). Although these components are shown and described as discrete in nature, they may readily be integrated into a single package which can perform the video and audio communication functions contemplated herein.

A communications pack antenna 29 extends vertically from pack 47, a short distance. The antenna is interconnected within pack 47, to video receiver 31, audio transmitter 43, and audio receiver 39. Pack 47 also includes a VELCRO or belt loop arrangement on its back side, for attachment to the technician's belt. Alternatively, the communications pack 47 could be installed on a suitable backpack or directly on the helmet 34. In the disclosed construction, the helmet and communication pack are comfortable for the technician to wear, and sufficiently small and unobtrusive that he can undertake inspection and testing procedures wearing both units.

With particular reference to FIG. 1, it will be noted that computer 16 is interconnected to test equipment 15, for receipt of test results and for management of the testing procedures used by the equipment. Both from its own internal data base and from results produced by test equipment 15, visual data are routed from an output of the computer 16 to a splitter/converter 26. The splitter/converter 26 divides a video output of the computer, and passes appropriate video signals both to a console video monitor 27 and to a console video transmitter 28. Commercially available devices which can perform the function of splitter/converter 26 include the VIDEOVERTER VID 703N or the TELEBYTE 711 PC.

It should be noted that splitter/converter 26 is not required in all instances. The video signal from the computer 16 only needs to be converted where the video output of the computer is not appropriate for direct feed to a video transmitter. This would be the situation, for example, where the output of the computer is VGA computer video, which needs to be converted to NTSC video before it can be broadcast by transmitter 28.

In the preferred embodiment disclosed herein, the console video monitor 27 allows an inspector 21 to view information such as the test procedure, vehicle identification characteristics data, ECS data, and test results data in the customary way. Video monitor 27 also permits more than one inspector or supervisor to participate in the inspection, and provides a backup, in the event of temporary failure of the communication link 17.

Console video transmitter 28 is connected to antenna 25, for transmission of a radio frequency signal via wireless link 17, to interface video receiver 31. Video transmitter 28 and video receiver 31 are of conventional design, such as a PELCO WLV 1000 series WIRELESS VIDEO TRANSMISSION SYSTEM. The video receiver 31, in turn, generates a video output signal, which is delivered to the video visor 22 over drive cable 46. While it is preferred that the wireless link 17 is operated at radio frequencies, other frequencies of operation, including infrared light, may prove equally useful. Wireless link 17 may employ discrete frequencies for the single video and the two audio communication circuits contemplated herein, or certain information may be multiplexed on a single channel.

Figure 4:
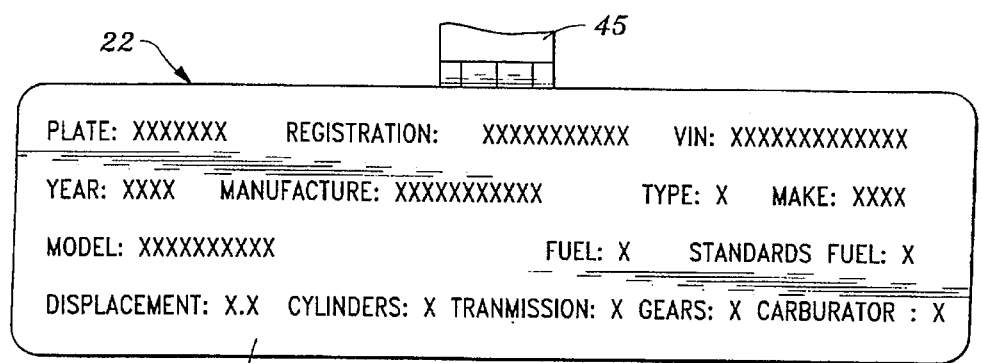

Visor 22 displays the same information directly to the technician 21, as is concurrently displayed on video monitor 27. FIG. 4 shows an example of certain vehicle identification characteristics which might be used during the testing procedure, and displayed upon screen 33. Upon an examination of the vehicle, this information is entered into the computer memory system by the technician, in a manner to be discussed below. Of course, other video information may be displayed upon screen 33, as necessary to complete the testing and inspection procedures. For example, the composite video image shown in U.S. Pat. No. 5,414,626, may be displayed to show the locations of necessary ECS components, within an underhood image of the vehicle under test. Other information for display may include testing procedures, readout of vehicle operating conditions, and exhaust emission pass/fail determinations.

It is also apparent that remote two-way transmission of audio information should be particularly advantageous in furtherance of the objectives of the present invention. This capability allows the technician to remain visually attentive to the features and operation of the vehicle before him, while concurrently receiving a continuous flow of audio data and audio prompts from the computer 16. Also, as the testing and inspection proceed, the technician is able directly to enter results into the computer and control the computer's operation. Provision is therefore made for two-way wireless transmission of aurally expressed data, as will now be explained.

As shown in FIG. 1, the computer 16 includes a sound card 36 to generate an outgoing audio signal from digital data, and to convert an incoming audio signal into digital data for use by the computer. A commercial device which may be used for card 36 is a CREATIVE LABS AWE 32. The output audio signal may include, but is not limited to, speech generated from software (i.e. the CREATIVE LABS product called, "TEXT TO SPEECH"), replay of digitized recordings and synthesized notes or other sounds, for feedback to the technician. The incoming audio signal would include the technician's vocal commands and factual determinations from inspection and testing.

The audio signal is sent to a sound mixer 37 where other sources may selectively be mixed with or override the computer generated signals. For example, if the voice commands of the technician were mixed in, the technician would receive an aural confirmation that each command was received by the computer console. Another source could be an audio signal from an intercom (not shown), located in a customer waiting booth; the technician could thereby obtain oral information from the customer, if need be.

The mixed audio signal is fed to a console audio transmitter 38, establishing a wireless communication link 17, via antennas 25 and 29, with interface audio receiver 39. The audio output of the receiver 39 is fed through wires 40, to the audio transducer 23 within helmet 34. The semi-enclosing helmet is effective in noisy environments to isolate the technician's ears from extraneous sounds. Through this system, the technician is readily able to hear information and prompts transmitted from the computer 16 to him.

To enter data and issue commands to the computer, the technician can approach the computer 16 and manually manipulate a keyboard 41 on the console 14. This, however, requires a special trip to the computer, taking additional time and removing the technician from the vehicle under test.

Alternatively, and preferably, the microphone 24 may be used to capture the technician's spoken commands and information. The signal from the microphone 24 is fed by microphone cord 18 to interface audio transmitter 43, within communications pack 47. The radio frequency signal emitted from antenna 29 establishes a wireless communication link 17 with antenna 25. Console audio receiver 44 receives the signal from antenna 25, and delivers the detected audio to sound card 36. The received audio may also be directed to sound mixer 37, and rebroadcast as a confirmation to the technician, as discussed above.

The audio transmitter 38 and audio receiver 39, may be system integrated with a video receiver unit. In other words, an audio transmission capability and a video transmission capability are both found in the PELCO WLV 1000 series WIRELESS VIDEO TRANSMISSION SYSTEM, referred to above in connection with the console transmitter/receiver pair 28 and 31. This system includes a transmission channel for audio as well as video, in the same package.

Software, such as IBM's CONTINUOUS SPEECH FOR WINDOWS product, receives the audio signal from the sound card, processes it, and delivers it to an input of the computer 16. The test software of the computer 16 is thereby provided with the spoken commands and information, such as vehicle identification characteristics and inspection and test results, received from the technician 21.

Although the present embodiment discloses only one voice recognition system between the sound card 36 and the computer 16, it is evident that provision can readily be made for a plurality of voice recognition systems arranged in parallel relation, in order to permit use of the computer 16 by multiple technicians, or to allow multiple computers to be accessed by a single technician, performing a single or multiple tasks.

In some installations, it may be preferable to transmit only video information from the computer to the technician's user interface, thereby eliminating the need for the sound mixer, the console audio transmitter, and the interface audio receiver. In this case, all of the information communicated to the technician, including prompts, confirmations, testing procedures, and the like, would appear visually, on the display of the visor. As sequences are carried out, visual prompts, blinking characters, symbols, or lines, or changing colors, for example, can be used to guide the technician through the testing and inspection procedures. In such installations, the microphone and the associated interface audio transmitter and the console audio receiver are retained, and used as described above, for the entry of data and commands by the technician.

In this manner, a technician could work effectively in a noisy environment, without reliance upon aural cues or voiced information from the computer. Such an approach would also enable a deaf technician effectively to perform the vehicle testing and inspection tasks described above. Computer software for carrying out the testing and inspection procedures solely by visual displays and cues, is well within the ability of those skilled in the present art.

It will be appreciated, then, that we have disclosed herein an apparatus and method for enhancing the efficiency and accuracy of testing emission control systems for motor vehicles.

What is claimed is:

1. An apparatus for effecting wireless disclosure between a computer and a technician/user in testing and inspecting the emission control systems of a motor vehicle located within a work area, said apparatus comprising:
   a. a computer having a data base and software for testing and inspecting emission control systems of motor vehicles, said computer further having an output for video data, an output for computer audio data, and an input for technician audio data and commands;
   b. a computer console video transmitter connected to said video output;
   c. a computer console audio transmitter connected to said audio output;
   d. a computer console audio receiver connected to said audio input; and,
   e. a user interface located within the work area, said interface including: an interface video receiver responsive to said console video transmitter; a video display connected to an output of said video receiver; an interface audio receiver responsive to said computer console audio transmitter; an audio transducer connected to an output of said audio receiver; a microphone; and, an interface audio transmitter connected to said microphone, said console audio receiver being responsive to said interface audio transmitter, whereby in a location remote from said computer, the technician may view said video data and hear said computer audio data, and the technician may voice audio data and commands to said computer.

2. An apparatus for effecting wireless discourse between a computer and a technician/user in testing and inspecting the emission control systems of a motor vehicle located within a work area, said apparatus comprising:
   a. a computer having a data base and software for testing and inspecting emission control systems of motor vehicles, said computer further having outputs for computer generated audio and computer generated video, and having an input for technician voiced audio data and commands;
   b. video communication means for wirelessly communicating said computer generated video to the technician, within the work area;
   c. means, responsive to said video communications means, for displaying said computer generated video before the technician's field of view;
   d. first audio communication means for wirelessly communicating said computer generated audio to the technician, within the work area;
   e. transducer means responsive to said audio communication means for generating an audio frequency wave audible to the technician; and,
   f. second audio communication means for wirelessly communicating technician voiced audio data and commands to said computer, said second audio communication means having an audio output connected to said computer audio input.

3. An apparatus as recited in claim 2, wherein said video communication and displaying means comprise:
   a. a video data transmitter having an input connected to said video output of said computer;
   b. a video data receiver having an output located adjacent the technician; and,
   c. a video visor connected to said output of said video data receiver, said visor including a display for the video data, said visor being worn by the technician and said display being disposed within the technician's field of view.

4. An apparatus as recited in claim 2, wherein said first audio communication means and said transducer means comprise:
   a. a first audio data transmitter having an input connected to said audio output of said computer;
   b. a first audio data receiver having an audio output located adjacent the technician; and,
   c. a speaker responsive to said audio output of said first audio data receiver.

5. An apparatus as recited in claim 4, wherein said second audio communication means comprises:

a. a microphone arranged to capture the technician's voiced audio data and commands;

b. a second audio data transmitter connected to said microphone; and, c. a second audio data receiver, said second audio data receiver having an output connected to said audio input of said computer.

6. An apparatus as recited in claim 5, wherein said speaker, said means for displaying said computer generated video, and said microphone are installed on a helmet-like structure worn by the technician.

7. An apparatus as recited in claim 2 further including a console, a console video monitor located on said console, and a splitter/converter having an input connected to said video output of said computer, said splitter/converter having a first output connected to said video communication means and a second output connected to said console video monitor.

8. An apparatus as recited in claim 4 further including a sound card interposed between said audio output of said computer and said first audio data transmitter, to convert a digital data provided by said computer into an audio signal.

9. An apparatus as recited in claim 8 in which said sound card is further interposed between said output of said second audio data receiver and said audio input of said computer, to convert an audio signal provided by said second audio data receiver into digital data.

10. Apparatus for establishing wireless discourse between a computer and a technician/user, inspecting and testing the emission control systems of a motor vehicle in a work area, comprising:

a. test equipment connected to the motor vehicle under test;

b. a computer including a data base and software for testing and inspecting emission control systems of motor vehicles, said computer having a test data input connected to said test equipment, and further having a sound card and an audio input;

c. a video transmitter connected to a video output of said computer;

d. a video receiver located on the technician;

e. a video visor driven by an output of said video receiver, said visor being worn by the technician and including a display disposed within the technician's field of view;

f. a microphone located adjacent the technician's mouth;

g. an audio data transmitter located on the technician and responsive to an output of said microphone; and, h. an audio data receiver having an output connected to said audio input of said computer, whereby, test data, emission control systems data, and inspection and test data are selectively shown on the display, and data and commands voiced by the technician, are entered into and acted upon said computer.

11. A method for establishing wireless discourse between a computer and a technician in the course of inspecting and testing emission control systems of a motor vehicle, within a work area, comprising the steps of:

a. providing a computer having a data base and software for testing and inspecting emission control systems of motor vehicles, said computer having a video data output, an audio data output, and an audio data and control input;

b. generating video data and audio data relating to testing and inspection of emission control systems;

c. converting the video data to a video data signal;

d. converting the audio data to an audio data signal;

e. wirelessly transmitting the video data signal to a video receiver adjacent a technician interface;

f. wirelessly transmitting the audio data signal to a audio receiver adjacent said technician interface;

g. displaying said video data within the technician's field of view;

h. aurally outputting the audio data, so that the technician can hear the audio data in any location within the work area;

i. detecting and wirelessly transmitting the technician's voiced data and commands from said technician interface to an audio receiver; and, j. delivering an audio output from said audio receiver to said audio data and command input of said computer.

12. A method for establishing test computer and technician wireless discourse in testing motor vehicle emission control systems measured by vehicle-connected test equipment comprising the steps of:

a. providing a computer having a data base and software for testing and inspecting emission control systems of motor vehicles, said computer having a video data output, an audio data output, and an audio data and a control input;

b. wirelessly transmitting said computer video data output to a video receiver on the technician;

c. wirelessly transmitting said computer audio data signal to a first audio receiver on the technician;

d. displaying said computer video data from said video receiver on a screen within the technician's field of view;

e. directing said computer audio data from said first audio receiver to a speaker located within the technician's range of hearing;

f. wirelessly transmitting data and commands voiced by the technician a second audio receiver; and, g. directing said data and commands of the technician's from said second audio receiver to said audio input of said computer.

13. A method as in claim 12 further including the step of providing test equipment having at least one sensor connected to a motor vehicle under test and in which said computer has a data test input connected to an output of said test equipment, said test data being selectively sampled by said computer and stored as emission test results.

14. A method as in claim 13 in which one sensor is an exhaust pipe probe, and further including a spark plug sensor wire connected to a spark plug wire of the motor vehicle under test.

15. A method as in claim 13 in which the technician operates the motor vehicle in accordance with a predetermined driving cycle, and in which the emission test results are sampled and stored during the course of that driving cycle.

16. A method as in claim 15 in which an engine for the motor vehicle under test is selectively and variably loaded during the course of the predetermined driving cycle.

17. The method of claim 12 further including the step of the technician inspecting the motor vehicle under test regarding the presence and condition of emission control systems, and voicing that data for storage by said computer.

18. A method as in claim 12 in which the computer video data shows both the location and the identification of emission control systems for the vehicle under test.

19. The method of claim 18 further including the step of the technician inspecting the vehicle under test regarding the presence and condition of emission control systems, and voicing that data for storage by said computer.

20. A method as in claim 12 in which the motor vehicle under test has an evaporative fuel system, and further including the step of the technician testing the evaporative fuel system, and voicing the results for storage by said computer.

21. An apparatus for effecting wireless discourse between a computer and a technician/user in testing and inspecting the emission control system of a motor vehicle located within a work area, said apparatus comprising:
   a. a computer having a data base and software for testing and inspecting emission control systems of motor vehicles, said computer further having output for computer generated audio and computer generated video, having an input for technician voiced audio data and commands;
   b. video communication means for wirelessly communicating said computer generated video to the technician, within the work area;
   c. means, responsive to said video communication means, for displaying said computer generated video before the technician's field of view;
   d. first audio communication means for wirelessly communicating said computer generated audio to the technician, within the work area;
   e. transducer means responsive to said audio communication means for generating an audio frequency wave audible to the technician; and
   f. second audio communication means for wirelessly communicating technician voiced audio data and commands to said computer, said audio communication means having an audio output connected to said computer audio input;
   g. wherein said video communication and displaying means comprise:
      a video data transmitter having an input connected to said video output of said computer;
      a video data receiver having an output located adjacent to the technician; and,
      a video visor connected to said output of said video data receiver, said visor including a display for the video data, said visor being worn by the technician and said display being disposed within the technician's field of view.

22. An apparatus for effecting wireless discourse between a computer and a technician/user in testing and inspecting the emission control system of a motor vehicle located within a work area, said apparatus comprising:
   a. a computer having a data base and software for testing and inspecting emission control systems of motor vehicles, said computer further having output for computer generated audio and computer generated video, having an input for technician voiced audio data and commands;
   b. video communication means for wirelessly communicating said computer generated video to the technician, within the work area;
   c. means, responsive to said video communication means, for displaying said computer generated video before the technician's field of view;
   d. first audio communication means for wirelessly communicating said computer generated audio to the technician, within the work area;
   e. transducer means responsive to said audio communication means for generating an audio frequency wave audible to the technician; and
   f. second audio communication means for wirelessly communicating technician voiced audio data and commands to said computer, said audio communication means having an audio output connected to said computer audio input; and
   g. a console, a console monitor located on said console, and a splitter/converter having an input connected to said video output of said computer, said splitter/converter having a first output connected to said video communication means and a second output connected to said console video monitor.

23. A method for establishing test computer and technician wireless discourse in testing motor vehicle emission control systems measured by vehicle-connected test equipment comprising the steps of:
   a. providing a computer having a data base and software for testing and inspecting emission control systems of motor vehicles, said computer having a video data output, an audio data output, and an audio data and a control input;
   b. wirelessly transmitting said computer video data output to a video receiver on the technician;
   c. wirelessly transmitting said computer audio data signal to a first audio receiver on the technician;
   d. displaying said computer video data from said video receiver on a screen within the technician's field of view;
   e. directing said computer audio data from said first audio receiver to a speaker located within the technician's range of hearing;
   f. wirelessly transmitting data and commands voiced by the technician a second audio receiver;
   g. directing said data and commands of the technician's from said second audio receiver to said audio input of said computer; and
   h. the technician inspecting the motor vehicle under test regarding the presence and condition of emission control systems, and voicing that data for storage by said computer.

24. A method for establishing test computer and technician wireless discourse in testing motor vehicle emission control systems measured by vehicle-connected test equipment comprising the steps of:
   a. providing a computer having a data base and software for testing and inspecting emission control systems of motor vehicles, said computer having a video data output, an audio data output, and an audio data and a control input;
   b. wirelessly transmitting said computer video data output to a video receiver on the technician;
   c. wirelessly transmitting said computer audio data signal to a first audio receiver on the technician;
   d. displaying said computer video data from said video receiver on a screen within the technician's field of view;
   e. directing said computer audio data from said first audio receiver to a speaker located within the technician's range of hearing;
   f. wirelessly transmitting data and commands voiced by the technician a second audio receiver;
   g. directing said data and commands of the technician's from said second audio receiver to said audio input of said computer; and
   h. wherein the computer video data shows both the location and the identification of emission control systems for the vehicle under test.

25. A method as recited in claim 24 further including the step of the technician inspecting the vehicle under test regarding the presence and condition of emission control systems, and voicing that data for storage by said computer.

26. A method for establishing test computer and technician wireless discourse in testing motor vehicle emission control systems measured by vehicle-connected test equipment comprising the steps of:
 a. providing a computer having a data base and software for testing and inspecting emission control systems of motor vehicles, said computer having a video data output, an audio data output, and an audio data and a control input;
 b. wirelessly transmitting said computer video data output to a video receiver on the technician;
 c. wirelessly transmitting said computer audio data signal to a first audio receiver on the technician;
 d. displaying said computer video data from said video receiver on a screen within the technician's field of view;
 e. directing said computer audio data from said first audio receiver to a speaker located within the technician's range of hearing;
 f. wirelessly transmitting data and commands voiced by the technician a second audio receiver;
 g. directing said data and commands of the technician's from said second audio receiver to said audio input of said computer; and
 h. wherein the motor vehicle has an evaporative fuel system and further including the step of the technician testing the evaporative fuel system, and voicing the results for storage by said computer.

27. An apparatus for effecting wireless discourse between a computer and a technician/user in testing and inspecting a plurality of interconnected components located within a work area, said apparatus comprising:
 a. a computer having a data base and software for testing and inspecting a plurality of interconnected components, said computer further having output for computer generated audio and computer generated video, having an input for technician voiced audio data and commands;
 b. video communication means for wirelessly communicating said computer generated video to the technician, within the work area;
 c. means, responsive to said video communication means, for displaying said computer generated video before the technician's field of view;
 d. first audio communication means for wirelessly communicating said computer generated audio to the technician, within the work area;
 e. transducer means responsive to said audio communication means for generating an audio frequency wave audible to the technician; and
 f. second audio communication means for wirelessly communicating technician voiced audio data and commands to said computer, said audio communication means having an audio output connected to said computer audio input.

28. An apparatus as recited in claim 27 wherein said video communication and displaying means comprise:

a. a video data transmitter having an input connected to said video output of said computer;
 b. a video data receiver having an output located adjacent to the technician; and,
 c. a video visor connected to said output of said video data receiver, said visor including a display for the video data, said visor being worn by the technician and said display being disposed within the technician's field of view.

29. An apparatus as recited in claim 27, wherein said first audio communication means and said transducer means, comprise:
 a. a first audio data transmitter having an input connected to said audio output of said computer;
 b. a first audio data receiver having an audio output located adjacent the technician; and
 c. a speaker responsive to said audio output of said first audio data receiver.

30. An apparatus as recited in claim 29, wherein said second audio communication means comprises:
 a. a microphone arranged to capture the technician's voiced audio data and commands;
 b. a second data transmitter connected to said microphone; and
 c. a second audio data receiver, said second audio data receiver having an output connected to said audio input of said computer.

31. An apparatus as recited in claim 30 wherein said speaker, said means for displaying said computer generated video, and said microphone are installed on a helmet-like structure worn by the technician.

32. A method for establishing test computer and technician wireless discourse in testing and inspecting a plurality of interconnected components, within a work area, comprising the steps of:
 a. providing a computer having a data base and software for testing and inspecting a plurality of interconnected components, said computer having a video data output, an audio data output, and an audio data and a control input;
 b. wirelessly transmitting said computer video data output to a video receiver on the technician;
 c. wirelessly transmitting said computer audio data signal to a first audio receiver on the technician;
 d. displaying said computer video data from said video receiver on a screen within the technician's field of view;
 e. directing said computer audio data from said first audio receiver to a speaker located within the technician's range of hearing;
 f. wirelessly transmitting data and commands voice by the technician a second audio receiver; and
 g. directing said data and commands of the technician's from said audio receiver to said audio input of said computer.

33. A method as recited in claim 32 in which the computer video data shows both the location and the identification of the particular ones of the plurality of interconnected components.

* * * * *